RECORDER CONTROLLED AUTOMATIC DIALING AND MESSAGE REPORTING SYSTEM

Filed July 7, 1966 3 Sheets-Sheet 1

INVENTOR
JOHN L. MENKE
BY Beale and Jones
ATTORNEYS

INVENTOR
JOHN L. MENKE
BY Beale and Jones
ATTORNEYS

INVENTOR
JOHN L. MENKE
BY Beale and Jones
ATTORNEYS

3,461,241
RECORDER CONTROLLED AUTOMATIC DIALING AND MESSAGE REPORTING SYSTEM

John L. Menke, Barnesville, Md. 20703

Filed July 7, 1966, Ser. No. 563,442
Int. Cl. H04m *11/04*
U.S. Cl. 179—5 19 Claims

ABSTRACT OF THE DISCLOSURE

An alarm system for monitoring a variety of input signals and energizing a recorder in response to an alarm signal. The recorder provides a dialing signal to automatically place a telephone call to a preselected number, then transmits a prerecorded message concerning the nature and location of the alarm. Detector means may provide response to sounds, which sounds may be recorded and transmitted upon completion of the prerecorded message.

The present invention relates generally to the art of burglar alarms, fire detection systems and the like and, more particularly, to an alarm system capable of responding to an input signal, automatically placing a telephone call to a preselected number, transmitting a message to the called station and then recording and simultaneously transmitting any sounds in the protected area to the called station.

The present invention provides an alarm system capable of responding to a variety of input signals. Such input signals are, typically, sounds picked up by a listening public address system, signals produced by a fire detection system, sounds transmitted along a fence to a microphone, or the like, but any electrical signal from any problem of surveillance may be adapted for use with this system. The present system utilizes a small tape recorder which serves not only to provide dialing pulses and a message, and to record input signals, but also to control the sequence of operation of the system. Input signals to the system from any suitable detector means are amplified and are integrated in a circuit of about 30 seconds time constant. This circuit is designed to ignore isolated signals, unless they are very large, but may be set to sense, for example, a continuous, low-level voice signal and to provide an output signal in response thereto. The presence of an input signal having the characteristic to be detected produces an output signal from the integrator, which output signal is fed to a silicon controlled rectifier trigger circuit to cause the SCR to turn on. Switching the SCR to its conductive state provides an output signal from the SCR which turns on the tape recorder and closes a reed relay, the relay acting to connect the system to a telephone system transmission line when the alarm is plugged into an ordinary telephone jack. The actuation of the reed relay simulates the lifting of a telephone handset. Pre-recorded signals on the magnetic tape operate to open and close the reed relay switch to simulate the dialing of a telephone. The number so dialed may be a local fire or police station, or may be a central switchboard, for example. After the dialing operation has been completed, an electrically conductive marker strip on the magnetic tape closes a self-holding relay which disconnects the dialing circuit, switching the alarm system from the dialing mode to the message mode to permit a prerecorded message to be played over the telephone line. This message may, for example, give information as to the type of emergency being signaled and the location of the emergency. Upon completion of the message, a second conducting strip on the magnetic tape closes a second relay, switching the tape recorder to its record mode. The recorder then records any further input signals, while at the same time transmitting them over the telephone line. Near the end of the tape, a third conducting strip closes a third relay which shuts off the recorder motor and releases the reed relay switch, disconnecting the system from the telephone line and effectively hanging up the telephone.

Through the use of printed circuits, solid state components and a small, non-capstan drive tape recorder, the alarm system of the present invention can be made compact, inexpensive to purchase and operate, and very versatile. It can provide direct telephone contact with a police or fire station, can give a message describing the type of emergency, and can permit the called station to listen to the sounds occurring in the area under surveillance. The system also provides a permanent record of such sounds for later use. The system may easily be connected to an ordinary telephone line, rather than to leased lines and, even when switched to the ready condition, does not interrupt normal use of the telephone.

A preselected number can be recorded on the magnetic tape merely by plugging an ordinary telephone into the alarm device, switching the alarm system to its prerecord mode, and dialing the desired number. The dialing pulses will be recorded on the tape and since these impulses are taken from an ordinary telephone, there is no problem of timing in effecting alarm system dial-out. Further, since the same tape recorder is used for both recording the dial impulses and for playing them back a non-capstan drive, variable speed tape recorder may be used, inasmuch as variations in the recorder speed will be the same in both record and playback.

Adding to the simplicity of the system is the use of conductive strips on the magnetic tape itself which are used to control the operation of the alarm system. The pickups for the tape control commands are simple and rugged, providing reliability without the expense usually involved in the pickup finger contacts usually in use. Further, with the pickup contacts arranged as in the present invention, threading of a magnetic tape into the recorder is made very simple.

Although the prior art discloses automatic systems which respond to a predetermined signal to relay an alarm to a central station by way of a telephone line, and further teaches the use of such signals to initiate an operation which electronically lifts a telephone receiver and starts a tape recorder to produce audio signals to effect the dialing of a telephone and transmission of a prerecorded voice message, such prior systems suffer several disadvantages over the present system. For example, many prior systems require the use of leased lines and are not capable of being connected to the usual telephone transmission lines. Systems which are capable of being attached to existing telephone lines often interfere with normal use of the telephone by continuously loading the telephone line and, further, are subject to transients on the line itself which may damage the system or cause false alarms. Many prior systems require expensive and complex dialing relay systems in order to obtain the required speed and timing of the dialing operation, or utilize complex timing mechanisms to control the mode of operation of the system. Some of these systems are not adaptable to use with various input signals and do not provide sensitivity control for use in various environments. Generally, these systems are complex, expensive and not reliable. Although the use of conductive strips on magnetic tape is known as a means of controlling the operation of a recorder, prior systems require complex sensing mechanisms which make it difficult to thread the tape into the recorder, difficult to align the tape and sensing means properly, and expensive to manufacture.

It is therefore an object of the present invention to overcome the disadvantages of the prior art by providing an alarm system which is capable of responding to various detected signals to connect itself to a telephone line, to automatically dial a predetermined number, to give a message identifying the location and cause of the alarm signal, and to record any continuing input signals while transmitting the same over the telephone line, the system being so arranged as not to interrupt or interfere with normal telephone usage.

A further object of the present invention is the provision of an alarm system utilizing an integral tape recorder which controls the operation of the system after receipt of an alarm signal.

Another object of the present invention is the provision of a tape recorder-controlled alarm system in which any predetermined telephone number and voice message may be recorded on magnetic tape, the tape including spaced conductive strips for closing switch contacts at selected times during operation of the recorder to switch the system from one mode of operation to another.

It is a further object of the invention to provide a tape-controlled alarm system having a magnetic tape which includes conductive strips spaced so as to close a plurality of switch contacts sequentially, the contacts being mounted on a tape guide post.

A further object of the invention is the provision of a tape-controlled alarm system having switch contacts embedded in the tape guide posts of the tape recorder, the contacts being closed by means of conductive strips on the magnetic tape, wherein there is provided a reliable, yet simple construction.

A further object of the invention is the provision of an alarm system having a dial-out mode of operation, a message mode and a record mode, the system being controlled by conductive strips on a magnetic tape and by relays responsive thereto to switch the system from one mode to the next.

Another object of the present invention is the provision of an alarm system suitable for connection to a conventional telephone line, the alarm system being isolated from the telephone system to prevent interference with or by the alarm system, the alarm system being easily connectable to the telephone line by closure of a relay switch which simulates the picking up of a telephone handset.

An additional object of the invention is the provision of an alarm system utilizing an automatic tape recorder wherein telephone dialing signals are prerecorded directly from an ordinary dial telephone plugged into the alarm system, thus eliminating the problems of dial pulse timing.

A further object of the invention is to provide an alarm system which is adaptable for use with both high and low level input signals, the sensitivity of the system being adjustable to regulate the type of signal which will actuate the system.

An additional object of the invention is to provide an alarm system adapted for automatic transmission of dialing and message signals wherein both types of signals may easily be modified or may be reused repeatedly, as desired.

It is another object of the present invention to provide a tape recorder-controlled alarm system responsive to an input signal to automatically dial a predetermined telephone number, deliver a message and record subsequent input signals wherein is provided simple, yet reliable, control means for setting up and operating the system.

These and other objects of the invention will become apparent from what follows. Although the novel features which are characteristic of the invention are set forth with particularity in the appended claims, the invention will be understood more clearly and fully from the following detailed description, taken in connection with the accompanying drawings, in which:

FIG. 1 is a block diagram of an alarm system in accordance with the present invention and illustrating the manual and relay switches used to control the operation of the system;

FIG. 1A diagrammatically illustrates the functions of switch S1 and its various positions;

Figures 1, 1A:
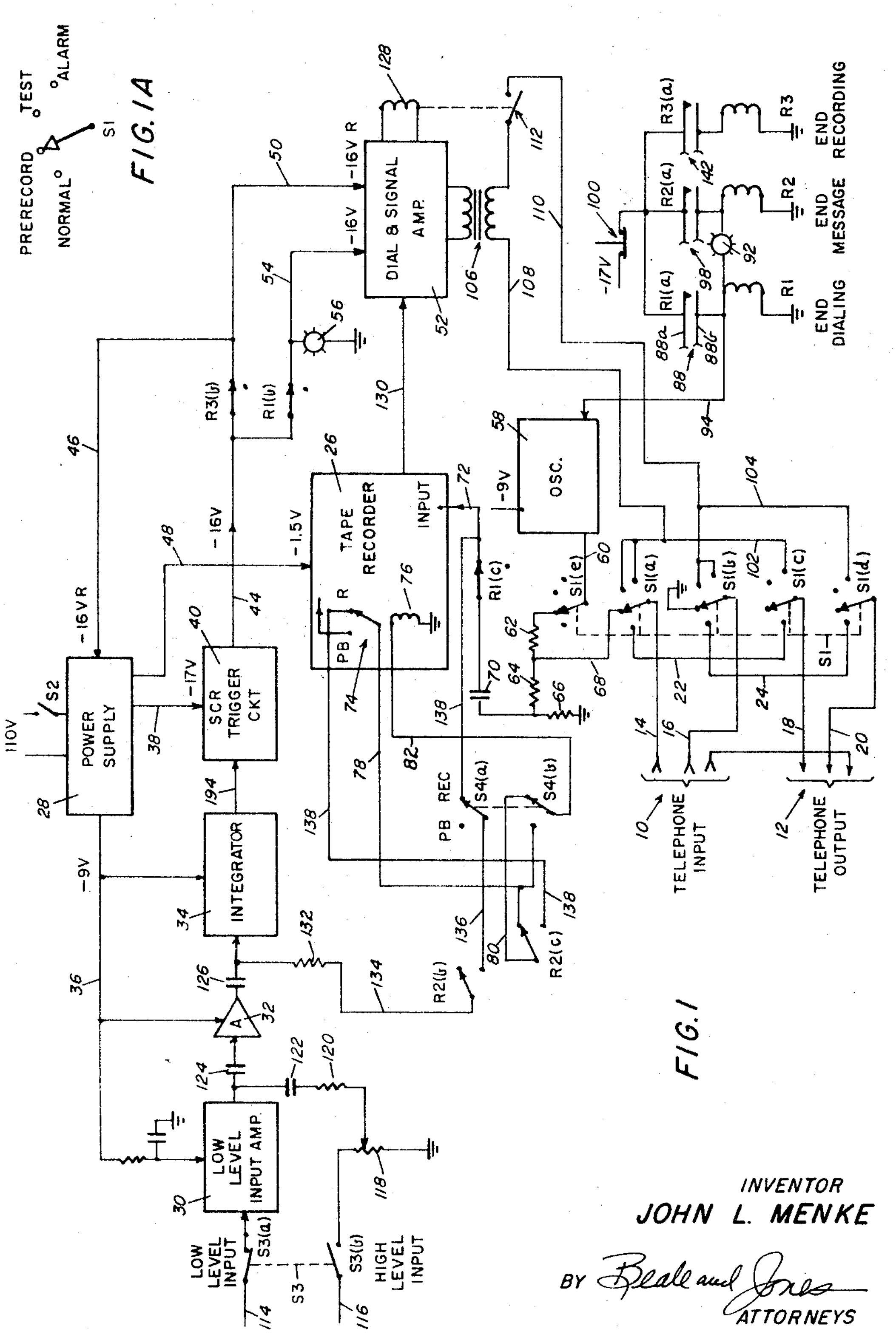

Referring now to the block diagram of FIG. 1, there are illustrated at S1, S2, S3 and S4 the series of manually operated switches by means of which the system of the invention may be turned on and set up for operative use as an alarm system. Switches R1(*a*), R2(*a*) and R3(*a*) are automatically-operated relay switches which are moved from their rest positions (as shown) to their energized position by excitation of self-holding relay coils R1, R2 and R3, respectively.

Illustrated at 10 and 12, respectively, are the input and output jacks for connecting the alarm system to a telephone and to a telephone line. A standard dial telephone utilizing a standard three or four conductor plug is connected to the system at 10. Similarly, the output of the system is obtained from pack 12, which may be connected to a standard telephone system wall jack or the like. When switch S1 is in the "normal" position illustrated in FIG. 1A, the telephone input 10 will be connected directly to the telephone output 12. Thus, lines 14 and 16 of the telephone input will be connected through switches S1(*a*) and S1(*b*) to corresponding output lines 18 and 20 through the respective jumper lines 22 and 24. When switch S1 is in the normal position the alarm system is isolated from the telephone system and will not affect the operation of the telephone in any way.

To prepare the system for use, there must first be recorded on the recording medium of a tape recorder 26 dial pulses representing the number which is to be called by the system in the event of an emergency situation. To accomplish this a standard dial telephone is plugged into input 10, switch S1 is changed to the "prerecord" position illustrated in FIG. 1A and switch S2 is closed to apply power to the system. Closure of switch S2 applies a 110 v. alternating current supply to a power supply circuit 28 which, upon energization, applies a 9 v. bias to a low level input amplifier 30, a second stage amplifier 32 and an integrator circuit 34 by way of line 36. The power supply also provides a 17 v. bias through line 38 to the silicon controlled rectifier trigger circuit 40. Inasmuch as no input signal is being received at either amplifier 30 or 32, the silicon controlled rectifier remains non-conductive until a test button 42 (FIG. 5) in trigger circuit 40 is pressed (closed). This causes the SCR to conduct and provides a 16 v. output on line 44, which output signal is applied through normally closed switch R3(*b*) and through line 46 to the last stage of power supply 28. The signal on line 46 provides the necessary bias for the last stage of the power supply, permitting a 1.5 v. output on line 48, which voltage is applied to the motor of tape recorder 26, turning the tape recorder on. The output of the SCR trigger circuit 40 also is applied through switch R3(*b*) and line 50 to the last stage of a dial and signal amplifier 52 and through a relay switch R1(*b*) and through line 54 to an earlier stage of amplifier 52. The signal appearing on line 54 also energizes a dialing light 56 which is connected between line 54 and ground. Enervalue. When this predetermined minimum value is reached, the integrator circuit 34 provides an input to the SCR trigger circuit 40, causing the SCR to switch to its conductive state, where it will remain until the reset button is pressed. As previously noted, conduction of the SCR causes the tape recorder to turn on and, at the same time, applies bias voltages through lines 50 and 54 to the dial and signal amplifier 52. Application of these voltages energizes the reed relay coil 128 causing relay switch 112 to close. Since switch S1 is in the alarm position, closure of relay switch 112 places the secondary of transformer 106 across the output telephone lines 18 and 20, simulating the picking up of a telephone handset. The application of bias voltage on line 54 connects the output from the tape recorder 26, which appears on line 130, to the dial and signal amplifier to be applied to the reed relay 128. The output signal appearing on line 130 may be taken from a tap on the output transformer of the tape recorder or from some other suitable point within the recorder circuitry.

With the recorder running, the prerecorded dialing signals will be detected by the playback head 76 and will be applied through line 82, switch S4(*b*), line 80, switch R2(*c*), line 78, and switch 74 to the playback circuitry of the tape recorder. These dialing signals will then be applied through line 130, through the dial and signal amplifier 52 and will appear as pulses on reed relay coil 128, each pulse causing relay switch 112 to open momentarily and then to close. The opening and closing of switch 112 varies the impedance load on the telephone output line and effects a dial-out operation in the known manner. At the end of this dial-out mode of operation, conductive strip 84 will energize relay R1 in the manner previously described, opening switches R1(*b*) and R1(*c*). The opening of switch R1(*b*) removes the bias voltage from line 54 and prevents further output signals from the tape recorder from reaching relay coil 128, thus preventing further output signals of the tape recorder from reaching coil 128 and interfering with the dial mechanism. After energization of relay coil R1, the voice message carried by magnetic tape 86 is then sensed by playback head 76 and applied through line 130 to the dial and signal amplifier 52. These signals are fed to the primary of audio transformer 106 for transmission through the telephone output lines to the called station. Upon completion of the voice message, conductive strip 96 energizes relay coil R2 in the manner previously described, closing the self-holding contacts R2(*a*), closing R2(*b*) and shifting R2(*c*) from its illustrated position to its alternate position. The closing of switch R2(*b*) connects the output of amplifier 32 through resistor 132, line 134, switch R2(*b*), jumper line 136, switch S4(*a*) and line 138 to the input terminal of tape recorder 26. Movement of switch R2(*c*) serves to bypass switch 74 of the tape recorder, which is in the playback position during this operation, to permit further signals from the detector units to be recorded on tape recorder 26. Thus, the input signals to the tape recorder, instead of passing through switch 74 and line 78 to the record head 76, pass through line 138, switch R2(*c*), line 80, switch S4(*b*) and line 82 to the record head 76. At the time these signals are being recorded, they are also being applied through line 130 to amplifier 52 and thence through transformer 106 to the telephone output lines, whereby the called station can listen to the signals being recorded. If, for example, the system is being used as a burglar alarm, the system might be adapted to respond to voice signals and such signal would then be recorded and, at the the same time, transmitted to the called station, providing a quick check on whether the alarm is a false alarm or whether there is, in fact, a burglary in progress.

Figure 8:
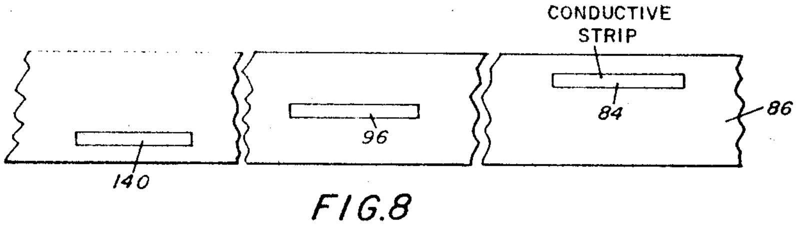
FIG. 8 is a diagrammatic illustration of the arrangement of the conductive switching strips carried by the magnetic tape used in the present system.

When the supply of tape in the tape recorder is almost exhausted, a third conductive strip 140 (FIG. 8), will close a third pair of contacts 142 to energize relay coil R3. Energization of R3 will close self-holding relay switch R3(*a*) and will open relay switch R3(*b*). Opening of R3(*b*) removes the bias voltage from line 46 to deenergize the tape recorder motor and removes the bias voltage from line 50 to deenergize reed relay coil 128. This opens switch 112 and disconnects the alarm system from the telephone output lines. The system then remains in this condition until it is reset and the magnetic tape is either rewound or replaced by a fresh supply.

The final available position of the selector switch S1 is the test position which permits simulation of an emergency situation without actually connecting the system to the telephone output lines, thus allowing the operation of the system to be checked before it is installed. With the selector switch S1 in the "test" position and the switch 74 in the "playback" system, the system is ready for simulated operation. It will be noted that the oscillator 58 is not connected to the input of the tape recorder, nor is either the telephone input 10 or the audio transformer 106 connected to the telephone output 12. By pressing the test button 42 (FIG. 5), the silicon controlled rectifier 202 is made conductive, turning on the tape recorder and energizing the dial and signal amplifier 52. The tape recorder will operate in the described manner, producing dial pulse signals on line 130 which serve to operate the reed relay 112. At the end of the dial operation, the relay R1 is energized and the system switches to the message mode. Voice signals are then applied through line 130 to dial and signal amplifier 52 and audio transformer 106. Upon completion of the message portion, relay R2 is energized to switch the system to the record mode and the tape recorder will then record any input signals received on line 72. At the end of the record mode, relay R3 will be energized to turn off the tape recorder and release reed switch 112. During the test period, the operator may monitor action of the system by listening on a telephone plugged into input jack 10.

By adjusting the lateral positions of the conductive strips on magnetic tape 86, the length of time available for each mode of operation of the system may be controlled. The various indicator lights provide a positive indication to the user of the particular mode in which the system is operating and thus advise the operator of what he is to do when preparing the tape for use. The P.B. (playback) position of switch S4 is used only when playing back sounds recorded during an emergency operation of the recorder. This is most easily done by setting switch S1 to Test, switch S4 to P.B., and listening to a telephone plugged into jack 10, the system otherwise being operated as above in the Test mode. The part of the tape used for recording sounds must be erased when setting up the system for operation.

Figure 2:
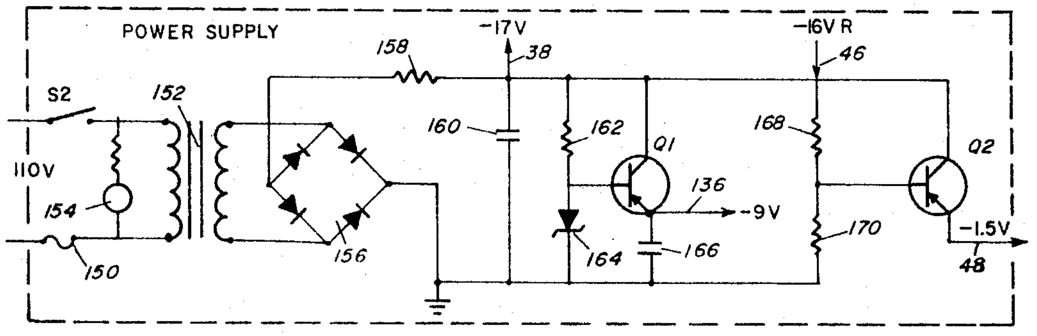
FIG. 2 is a schematic diagram of a power supply circuit suitable for use in the system of FIG. 1.

Referring now to the more detailed circuit diagrams of the system, FIG. 2 illustrates a power supply circuit suitable for use in this system. As shown, the 110 v. alternating current source is applied through switch S2 and fuse 150 to the primary windings of a power transformer 152. Connected across the input line is an indicator light 154. The output of power transformer 152 is rectified by a full wave bridge rectifier 156, the output of which is filtered by an RC network comprising resistor 158 and capacitor 160 to provide the 17 v. bias which appears on line 38. This voltage is applied through a divider circuit comprising resistor 162 and a voltage reference Zener diode 164 to the base of a transistor Q1. The collector of Q1 is connected to the junction of resistor 158 and capacitor 160 while its emitter is connected through a capacitor 166 to ground. The output of emitter follower Q1 is connected to line 36 to provide the required 9 v. bias source. The combination of Q1 and diode 164 acts as a voltage regulator, but it will be apparent that the small 9 v. Zener diode which is here used as a reference could be replaced by a large 9 v. Zener diode which would permit elimination of Q1. A second emitter follower transistor Q2 has its collector connected to the junction of 158 and 160, the emitter of Q2 being connected to line 48 to provide gization of power supply 28 also provides a suitable bias voltage for oscillator circuit 58 which produces an output signal on line 60.

The output appearing on line 60 of oscillator 58 is applied to the contacts of selector switch S1(*e*) so that when switch S1 is in the "prerecord" position this signal will be applied to the voltage divider network made up of resistors 62, 64, and 66. When the selector switch S1 is in any other position, the output of the oscillator does not affect the alarm circuit. The dial contacts of a telephone plugged into input 10 are connected across lines 14 and 16, and thus are connected between resistor 62 and ground, permitting the oscillator output to be modulated at the junction of resistors 62 and 64 by way of lines 14 and 68 during operation of the telephone dial. This modulated signal is fed through the voltage divider made up of resistors 64 and 66, the values of which are determined by experiment to obtain a good signal to noise ratio, through capacitor 70, relay switch R1(*c*), which is normally closed, and line 72 to the input of recorder 26. The modulated signals on line 72 are applied to a suitable input in the circuitry of the tape recorder, which input may, for example, be a tap in one of the amplifier stages within the recorder circuitry. This type of input will be preferable for small, inexpensive tape recorders which normally have only one input jack, thus leaving the input jack for use with a microphone for message recording. The playback-record switch 74 of the tape recorder is switched to its record position to apply the input signals from line 72 to the record-playback head 76. Although normally the record input through switch 74 is applied directly to the record-playback head 76, tape recorder 26 is modified for use in this system by opening this junction and connecting switch 74 to head 76 through line 78, relay switch R2(*c*), line 80, manually operated switch S4(*b*) and line 82, switch S4 being in the "record" position, as shown. Thus, to prerecord the telephone number which the system is to dial upon occurrence of an input signal representing the condition to be detected, the desired number is simply dialed on the telephone plugged into input 10, the opening and closing of the dial contacts applying bursts of audio frequency signals to the recording head 76 of the tape recorder as the telephone dial is released. These bursts are recorded on the magnetic tape of the recorder and are thus made available for automatic dial-out.

Continuing the preparation of the system for use, upon completion of the recording of the dial signal pulses, the first conductive marker strip 84 (FIG. 8) carried by the magnetic tape 86 closes a pair of contacts 88 to apply an energizing voltage to relay coil R1. Energization of R1 closes self-holding relay switch R1(*a*) which maintains the energization level of R1 after conductive strip 84 has passed by contacts 88. Simultaneously, lamp 92 is illuminated to indicate the end of the dialing mode and a bias voltage is applied through line 94 to oscillator 58 to disable the oscillator. Relay R1 also opens relay switches R1(*b*) and R1(*c*), removing the bias voltage from line 54, deenergizing dialing light 56 and disconnecting the output of oscillator 58 from the input to the tape recorder 26. The opening of relay switch R1(*c*) is necessary to prevent loading of the record input to the tape recorder during other uses of the recorder. The shut-off voltage applied through line 94 to oscillator 58 prevents stray pickup from the oscillator and may be eliminated if desired.

Illumination of lamp 92 indicates that the end of the dial-out portion of the magnetic tape has been reached and indicates that a voice input can then be applied through a suitable microphone to the tape recorder 26. This input is applied to the record terminal of switch 74, through line 78, relay switch R2(*c*), line 80, switch S4(*b*) and line 82 to the record head, whereby the desired message is transcribed on tape 86. When the end of the portion of tape 86 allotted to voice message has passed by the recording head, a second conductive strip 96 closes a second pair of contacts 98 to energize relay coil R2. This closes the self-holding relay switch contacts of R2(*a*) and raises the side of lamp 92, previously grounded through coil R2, to the bias voltage, turning off the lamp to indicate the end of the message portion.

At this point, the reset button 100 (FIG. 5) is pushed (opened) to cut off the silicon controlled rectifier in circuit 40 and to turn off the tape recorder. The magnetic tape is then rewound onto its supply reel and the system is ready for use. It should be noted that opening of reset button 100 also serves to remove the bias voltage from relay coils R1 and R2, thus releasing their respective relay switches and returning them to their original positions as shown.

To place the system in condition to respond to a detected emergency signal, selector switch S1 is changed to the "alarm" position (FIG. 1A) and the tape recorder switch 74 is changed to the playback position, while the positions of the remaining switches are unchanged. When switch S1 is in the alarm position, telephone input lines 14 and 16 are connected through switches S1(*a*) and S1(*b*), jumper lines 102 and 104 and switches S1(*c*) and S1(*d*) respectively, to lines 18 and 20 at output 12. This also connects the audio output transformer 106 of the dial and signal amplifier 52 across jumper lines 102 and 104 and thus across output lines 18 and 20. Transformer 106 is connected to lines 102 and 104 through lines 108 and 110, respectively, line 110 including a reed relay 112 which opens in response to dial-out signals from the tape recorder to simulate the dialing of a telephone. Reed relay 112 is normally open so that the alarm system does not load the telephone circuit and thus does not interfere with its operation. However, upon occurrence of a predetermined system input, relay 112 is closed, as will be described below, placing the low impedance secondary of transformer 106 across the output lines 18 and 20 and thus, in effect, lifting a telephone receiver handset and connecting the system to the output line.

With the switches arranged as noted above, the system is ready for use in providing an alarm signal in response to the occurrence of a specified condition of occurrence. The condition being monitored is sensed by a suitable detector element (not shown) which, in turn, provides an electrical output for application to the alarm system upon occurrence of an abnormal or predetermined condition. The input to the alarm system may be at a low level, in which case it is applied through input line 114, switch S3(*a*) to the low level input amplifier 30. If the input is at a high level, it is applied through line 116, switch S3(*b*), potentiometer 118, resistor 120, and capacitor 122 to the high level amplifier 32. The output of low level input amplifier 30 is applied through capacitor 124 to the input of high level amplifier 32. The low level input amplifier 30 may be a three-stage transistorized amplifier of conventional construction and provided with a variable resistor means to provide a sensitivity control whereby the level of response of the system may be adjusted to meet the requirements of a specific application. Similarly, the high level input is provided with sensitivity control means 118. The low level signals are measured in terms of millivolts and typically would be provided by loudspeakers being used as microphones in a surveillance system. The high level input is of the order of one volt and would typically be the output of an audio amplifier.

The system continuously monitors the amplitude of the signals from the detectors being used, and when these signals reach a certain value or have a certain characteristic it is desired to energize the alarm system. By providing this type of arrangement, the system is able to distinguish between unusual noises and the normal minimum background noises which are typical of the system environment, thus avoiding false alarms. To provide this selectivity, the signals applied to amplifier 32 are fed, after amplification, through coupling capacitor 126 to the input of the integrator circuit 34. This integrating circuit tends to ignore isolated signals unless they exceed a certain the 1.5 v. supply required to operate the tape recorder motor. Q2 remains non-conductive until an input voltage is present on line 46, which voltage is applied through a voltage divider comprising resistors 168 and 170 to the base of Q2.

Figure 3:
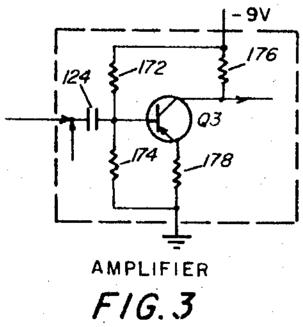
FIG. 3 is a schematic diagram of an amplifier useful in the system of FIG. 1.

FIG. 3 illustrates a transistor amplifier suitable for use in the system of FIG. 1 and comprises a transistor Q3 connected in conventional manner with the bias supply being connected through a voltage divider comprised of resistors 172 and 174 to the base of Q3 and through load resistor 176 to the collector thereof. The emitter of Q3 is connected through resistor 178 to ground. This amplifier is particularly suitable for use in the high level amplifier 32, but may also be adapted for use in the low level amplifier 30.

Figure 4:
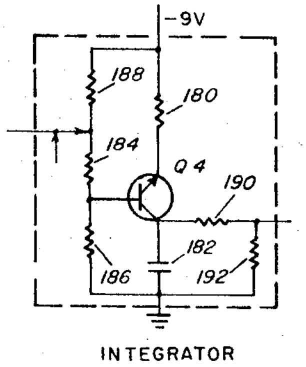
FIG. 4 is an integrator circuit suitable for use in the system of FIG. 1.

The integrator circuit 34 is illustrated in FIG. 4 and comprises a transistor Q4 having its emitter connected through resistor 180 to a bias source and its collector connected through a capacitor 182 to ground. Input signals to the base of transistor Q4 are applied through a voltage divider comprised of resistors 184 and 186 while a bias voltage is applied to the voltage divider through resistor 188. A pair of resistors 190 and 192 are connected across capacitor 182 and their junction is connected through line 194 to the input of the trigger circuit 40. The charging rate of capacitor 182 is determined by the amplitude of the input signal voltage applied to the base of Q4, by the capacitance value of 182 and by the value of the emitter resistor 180.

The integrator circuit is designed to be sensitive to voltage rather than current so that by using gain controlled amplifiers the sensitivity of the system will not vary significantly with temperature. This circuit can be adjusted to meet the requirements of a particular surveillance problem, for reduction of the value of either resistor 180 or capacitor 182 will increase the sensitivity of the system to short duration input signals. The minimum signal which will be integrated is determined by the amplitude of the voltage required to turn transistor Q4 on and thus by the value of bias resistor 186. After conduction of Q4 has charged capacitor 182, the capacitor will discharge through resistors 190 and 192, the value of these resistors and the value of the input impedance of SCR trigger circuit 40 determining the discharge time of capacitor 182. This discharge time establishes the spacing of input signals from the detector units which will be required to trigger the system. By reducing the discharge time, a greater number of isolated detector signals must be received per unit time to cause the alarm system to become operative, thus providing a better false alarm rejection. However, reduction of the discharge time provides less sensitivity of the system to long term low level signals. Thus, the particular values of the integrator circuit will be determined by the conditions under which the system is to operate.

Figure 5:
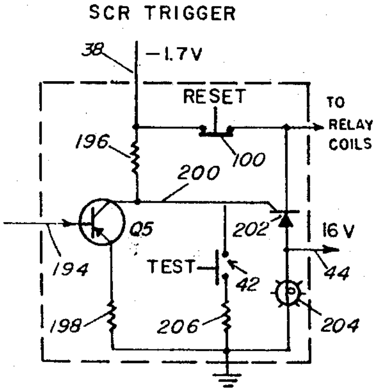
FIG. 5 illustrates a silicon controlled rectifier trigger circuit that may be used with the system of FIG. 1.

The circuitry of the silicon controlled rectifier trigger 40 is illustrated in FIG. 5, wherein transistor Q5 is arranged to receive and amplify an output from integrator circuit 34. The collector of Q5 is connected through a resistor 196 to a bias source while its emitter is connected through resistor 198 to ground. The output of the transistor is taken from its collector and applied through line 200 to the controlled electrode of a silicon controlled rectifier 202. The cathode of the SCR is connected through reset button 100 to the bias voltage carried by line 38 while its anode is connected through a "trigger" indicator light 204 to ground, the indicator light providing a means for determining whether the SCR is conducting. Test button 42 is connected between line 200 and ground through a resistor 206 to permit application of a firing voltage to the control electrode of the SCR even in the absence of an output from transistor Q5. When SCR 200 is made conductive, an output voltage appears on line 44 for use as described above with respect to FIG. 1.

Figure 6:
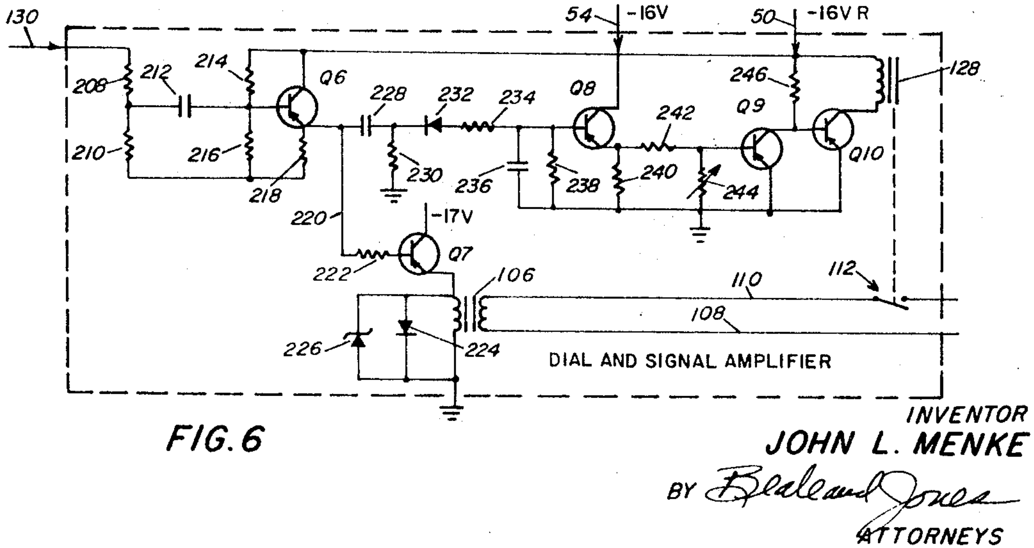
FIG. 6 is a schematic diagram of a dialing and signal amplifier for use in the alarm system of FIG. 1.
Figure 7:
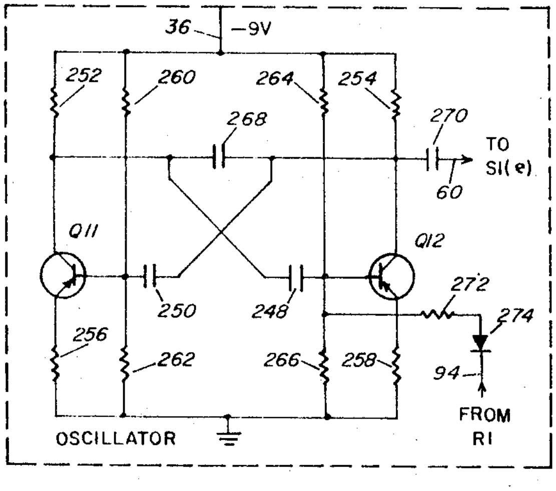
FIG. 7 illustrates an oscillator circuit that may be used in conjunction with the system of FIG. 1.

FIG. 6 illustrates the circuitry of the dial and signal amplifier 52 which receives output signals from the tape recorder 26 through line 130. These signals are applied through a voltage divider network comprised of resistors 208 and 210, which determine the amplitude of the signals which are applied to the telephone lines, and through a coupling capacitor 212 to the base of a transistor amplifier Q6. The base of Q6 is connected through a resistor 214 to a source of bias voltage and through a resistor 216 to ground, its collector is connected directly to the source of bias voltage and its emitter is connected through a load resistor 218 to ground. The output at the emitter of Q6 is applied through line 220 and resistor 222 to the base of emitter follower transistor Q7. The signals received by Q7 are fed to the primary winding of transformer 106 for transmission through the telephone output lines. Audio frequency signals from the tape recorder, which signals may be either the prerecorded message or sounds from the area under surveillance by the alarm system, are thus amplified and applied to the telephone lines. Connected across the primary of transformer 106 are diode 224 and Zener diode 226 which serve to limit the amplitude of the voltages applied to the primary of 106 by transients or line surges occurring in the telephone lines, and thus prevent damage to Q7.

Dial-out pulses applied through line 130 from the tape recorder are fed from the emitter of Q6 through an RC network comprised of capacitor 228 and resistor 230, through diode 232 and an RC filter comprised of resistor 234. and capacitor 236 to the base of a transistor switch Q8. The base of Q8 is connected through resistor 238 to ground, its emitter is connected through resistor 240 to ground and its collector is connected to the bias source appearing on line 54. Q8 responds to dial pulses to become conductive only when a bias voltage is applied to line 54, which voltage appears during the dial-out mode of operation of the system. At the start of the message mode, the bias is removed from line 54 and Q8 becomes non-conductive, preventing message signals from interfering with the reed relay 128.

Dial signal pulses appearing at the output of Q8 are applied through resistor 242 and across variable calibrating resistor 244 to the base of transistor switch Q9. The collector of Q9 is connected through resistor 246 to the source of bias voltage applied by way of line 50, while the emitter of Q9 is connected to ground. Q9 is normally non-conductive in the presence of a bias voltage on line 50, but the application of a dial pulse from Q8 serves to turn on Q9. The collector of Q9 is connected to the base of transistor switch Q10, the state of conductivity of Q9 controlling the conductivity of Q10. The emitter of Q10 is connected to ground while its collector is connected through reed relay coil 128 to the source of bias voltage appearing on line 50. In the presence of a bias voltage on line 50, transistor switch Q10 becomes conductive, energizing coil 128 to close reed switch 112. Each dial pulse applied to the base of Q9 turns on that transistor and thus turns transistor Q10 off, momentarily deenergizing coil 128 and opening switch 112. The series of dial pulses thus causes switch 112 to open and close in accordance with the prerecorded pattern of pulses to effect dial-out in a known manner. At the end of the dial sequence, Q8 is turned off, while Q10 remains conductive to hold switch 112 closed. When the end of the tape brings conductive strip 140 into contact with its corresponding switch contacts 142 to energize relay R3, the bias voltage is removed from line 50, Q10 becomes non-conductive and switch 112 opens.

The oscillator 58, which is used in prerecording the dial pulses on magnetic tape 86, is of conventional construction, and comprises transistors Q11 and Q12, cross-connected in known manner. Thus the collector of Q11 is connected through capacitor 248 to the base of Q12 and the collector of Q12 is connected through capacitor 250 to the base of Q11. The collectors of Q11 and Q12 are connected through resistors 252 and 254, respectively, to a source of bias voltage, their emitters are connected through resistors 256 and 258, respectively, to ground and their bases are connected through voltage dividers connected between the bias source and ground, the voltage dividers comprising resistors 260–262 and 264–266, respectively. The collectors of Q11 and Q12 are connected together through the capacitor 268 while the output waveform of the oscillator is obtained from the collector of Q12 and applied through a capacitor 270 to the output line 60. This output waveform approaches a sine wave configuration; however, it will be apparent that any shape wave form may be produced for the purposes of this system so long as the main components of the waveform are within the bandpass limits of the tape recorder. Inasmuch as the oscillator circuit is used only during the prerecording of dial pulses, the base of transistor Q12 is connected through resistor 272 and diode 274 to relay coil R1, whereby energization of R1 will apply a voltage to base of Q1 that will cut it off to prevent further oscillation of the circuit.

Figure 9:
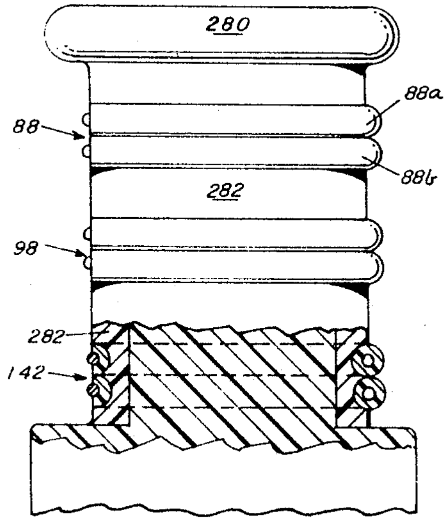
FIG. 9 illustrates the manner in which contact switches may be mounted on the tape recorder guide post for system mode control.

The construction of contacts 88, 98 and 142, which respond to the conductive strips on magnetic tape 86 to energize relays R1, R2 and R3, is illustrated in FIG. 9. Insulated copper wires are wrapped around a standard tape recorder tape guide post 280 and the post and wires are coated with a suitable material such as an epoxy 282. Two wires, for example **88*a* and 88*b* are used to make each set of contacts, each wire acting as one side of the contact. After the coating has set, those surfaces of the wires which come into contact with the magnetic tape as it is fed from the supply reel to the takeup reel on the recorder are sanded or filed to expose the copper portion of the wire. Thus, as each conductive strip passes by its corresponding pair of contacts (e.g., 88*a* and 88*b***) on the guide post, the conductive strip will cause a short circuit across the two wires effectively to close the contacts. This type of construction is easy to accomplish and permits virtually any tape recorder to be adapted to the type of control required for the present system. Thus, a very inexpensive tape recorder may be used and this substantially reduces the cost of building and operating the system.

Although a specific embodiment of the invention has been described hereinabove, it will be apparent to those skilled in the art that many modifications of the circuitry may be made without departing from the spirit of the invention. For example, an endless tape recorder of known type may be used to eliminate the need for rewinding the tape recorder. Further, the system could be provided with means sensitive to a telephone line busy signal to rewind the tape recorder and then redial the number to be called if a busy signal should be received. This redialing, of course, would automatically occur with an endless tape recorder system. It will further be apparent that switch S2, which serves as a power supply for the alarm system, should be a key switch so that the system can be turned off when the system is not being used, i.e., during normal use of a building, and turned on only when needed, i.e., during times when the building is to be protected. When sound-responsive detectors are being used, means will be required to turn off the sound input during times when telephones within the protected area are ringing in order to prevent false alarms.

Since these and other modifications will be apparent to those skilled in the art, it is desired that the foregoing description be taken as illustrative and limited only by the following claims:

I claim:

1. In an automatic alarm system having a dialing mode and a message mode, input means for receiving signals representing a condition being monitored, means responsive only to received signals of predetermined characteristics for producing a first output signal, recorder means having a recording medium, means for prerecording telephone dialing pulses and means for prerecording a message on said recording medium; first means responsive to said first output signal to connect said alarm system to a telephone system, second means responsive to said first output signal to turn said recorder on and to cause said alarm system to operate in its dialing mode, whereby said prerecorded dialing pulses are applied to said telephone system, first marker means carried by said recording medium, first sensing means responsive to said first marker means to shift said alarm system to said message mode at the end of said dialing mode, whereby said prerecorded message is applied to said telephone system, second marker means carried by said recording medium, second sensing means responsive to said second marker to shift said alarm system to an off condition, and selector switch means for preventing said alarm system from being connected to said telephone system during said prerecording of said telephone dialing pulses and message.

2. The automatic alarm system of claim 1, wherein said input means for receiving signals includes selectively connectable high-level and low-level inputs, and sensitivity adjustment means for each of said high-level and low-level inputs.

3. The automatic alarm system of claim 1, wherein said means responsive to received signals of predetermined characteristics includes an integrator circuit, the charging and discharging time of said integrator circuit determining the characteristic signals to which said integrator circuit will respond to produce an output voltage.

4. The automatic alarm system of claim 3, wherein said means responsive to received signals further includes first switching means having conductive and non-conductive states, and trigger means responsive to said output voltage from said integrator circuit to change said first switching means from its non-conductive to its conductive state to produce said first output signal.

5. The automatic alarm system of claim 1, wherein said means for prerecording dial pulses includes a conventional telephone dial, means for connecting said telephone dial to said alarm system, an oscillator, means for modulating the output of said oscillator with dial pulses from said telephone dial to produce modulated audio frequency pulses, and means for applying said modulated audio frequency pulses to said recording medium.

6. The automatic alarm system of claim 5, wherein said means for prerecording a message includes said first sensing means and a first contact switch means responsive to said first marker means to disable said oscillator, said message being prerecorded while said system is in the message mode and said recorder is in its record mode.

7. The automatic alarm system of claim 6, wherein said means responsive to received signals of predetermined characteristics includes an integrator circuit, first switching means having conductive and non-conductive states, and trigger means responsive to an output voltage from said integrator circuit to change said first switching means from its non-conductive state to its conductive state to produce said first output signal.

8. The automatic alarm system of claim 1, wherein said first means responsive to said first output signal to connect said alarm system to a telephone system includes second switching means having conductive and non-conductive states, dialing means connected to said second switching means for energization thereby, and a dialing switch operable by said dialing means, whereby said first output signal changes said second switching means to its conductive state to energize said dialing means and close said dialing switch.

9. The automatic alarm system of claim 8, wherein said recorder means is a magnetic tape recorder having input means for recording signals on said recording medium and output means for playback of signals recorded on said recording medium, said recording medium being a magnetic tape and said first and second marker means being conductive strips longitudinally and laterally spaced on said tape.

10. The automatic alarm system of claim 9, further including a drive motor for said recorder, said second means responsive to said first output signal to turn said recorder on comprising third switching means for energizing said drive motor.

11. The automatic alarm system of claim 10, wherein initial energization of said drive motor causes said alarm system to operate in its dialing mode, causing said prerecorded dialing pulses to appear at the output means of said recorder, fourth switching means responsive to each of the dialing pulses at the output of said recorder momentarily to disable said second switching means, thereby to disconnect and reconnect said alarm system and said telephone system to effect a dialing operation.

12. The automatic alarm system of claim 11 wherein said first sensing means responsive to said first marker means includes first contact switch means for energizing first mode switch means to disconnect the output means of said tape recorder from said fourth switching means, thereby to shift said alarm system to said message mode.

13. The automatic alarm system of claim 12, wherein said second sensing means includes a second contact switch means responsive to said second marker means to energize second mode switch means to disconnect said first output signal from said second and third switching means, disconnect said alarm system from said telephone system and to turn off said tape recorder drive motor.

14. The automatic alarm system of claim 1, wherein said system further includes a record mode for transmitting to said telephone system input signals received by said system during the record mode; third marker means carried by said recording medium intermediate said first and second marker means; and third sensing means responsive to said third marker means for shifting said alarm system to said record mode at the end of said message mode, said third sensing means including third mode switch means to connect said input signals to said telephone system.

15. The automatic alarm system of claim 14, wherein said third mode switch connects said input signals to the input means of said recorder for transmittal by way of the output of said recorder to said telephone system.

16. The automatic alarm system of claim 1, wherein said recorder means is comprised of a magnetic tape recorder and said recording medium is comprised of magnetic recording tape, said recorder further including guide post means for guiding said magnetic tape and contact switch means mounted on said guide post for contact with said marker means carried by said recording tape.

17. The automatic alarm system of claim 1, wherein said first and second marker means comprises first and second conductive strips longitudinally and laterally spaced on said recorder means, said alarm system further including a guide post on said recorder for guiding said recording medium, said first and second sensing means including first and second pairs of spaced contacts carried by said guide post, said first pair of contacts being positioned for closure by said first conductive strip, and said second pair of contacts being positioned for closure by said second conductive strip.

18. The automatic alarm system of claim 17, wherein each of said first and second pairs of spaced contacts comprises a pair of insulated wires located on the outer surface of said guide post, the insulation being removed from said wires at their points of contact with said conductive strips.

19. The automatic alarm system of claim 1, wherein said system further includes third sensing means responsive to third marker means carried by said recording medium, said third sensing means comprising a third mode switch means for connecting said input means to said telephone system, whereby signals received at said input means are transmitted to said telephone system.

References Cited

UNITED STATES PATENTS

| | | | |
|---|---|---|---|
| 2,827,515 | 3/1958 | Zuber | 179—5 |
| 3,140,349 | 7/1964 | Kezele | 179—5 |
| 3,188,392 | 6/1965 | Ferrell | 179—5 |

ROBERT I. GRIFFIN, Primary Examiner

WILLIAM S. FROMMER, Assistant Examiner